United States Patent
Pollman et al.

(10) Patent No.: US 7,558,356 B2
(45) Date of Patent: Jul. 7, 2009

(54) PROVIDING GLOBAL POSITIONING SYSTEM (GPS) TIMING SIGNALS TO REMOTE CELLULAR BASE STATIONS

(75) Inventors: Michael D. Pollman, Londonderry, NH (US); Theodore O. Grosch, Bolton, MA (US)

(73) Assignee: Airvana, Inc., Chelmsford, MA (US)

( * ) Notice: Subject to any disclaimer, the term of this patent is extended or adjusted under 35 U.S.C. 154(b) by 689 days.

(21) Appl. No.: 10/954,864

(22) Filed: Sep. 30, 2004

(65) Prior Publication Data
US 2006/0067451 A1   Mar. 30, 2006

(51) Int. Cl.
H04L 7/00 (2006.01)
(52) U.S. Cl. .................. 375/367; 375/354; 370/515
(58) Field of Classification Search .......... 375/354, 375/367; 370/515
See application file for complete search history.

(56) References Cited

U.S. PATENT DOCUMENTS

| | | | | |
|---|---|---|---|---|
| 5,872,774 | A  * | 2/1999 | Wheatley et al. | 370/335 |
| 6,198,390 | B1 * | 3/2001 | Schlager et al. | 340/540 |
| 6,590,881 | B1 * | 7/2003 | Wallace et al. | 370/332 |
| 6,621,813 | B2 * | 9/2003 | Petch et al. | 370/350 |
| 6,711,144 | B1 | 3/2004 | Kim et al. | |
| 6,731,618 | B1 | 5/2004 | Chung et al. | |
| 6,741,862 | B2 | 5/2004 | Chung et al. | |
| 6,781,999 | B2 | 8/2004 | Eyuboglu et al. | |
| 7,170,871 | B2 | 1/2007 | Eyuboglu et al. | |
| 7,200,391 | B2 | 4/2007 | Chung et al. | |
| 7,242,958 | B2 | 7/2007 | Chung et al. | |
| 7,277,446 | B1 | 10/2007 | Abi-Nassif et al. | |
| 7,299,278 | B2 | 11/2007 | Ch'ng | |
| 2002/0118669 | A1 * | 8/2002 | Kauhanen | 370/350 |
| 2002/0196749 | A1 | 12/2002 | Eyuboglu et al. | |
| 2003/0100311 | A1 | 5/2003 | Chung et al. | |
| 2004/0213367 | A1 * | 10/2004 | Han | 375/354 |
| 2005/0213555 | A1 | 9/2005 | Eyuboglu et al. | |
| 2005/0243749 | A1 | 11/2005 | Mehrabanzad et al. | |
| 2005/0245279 | A1 | 11/2005 | Mehrabanzad et al. | |
| 2006/0067422 | A1 | 3/2006 | Chung | |
| 2006/0067451 | A1 | 3/2006 | Pollman et al. | |
| 2006/0126509 | A1 | 6/2006 | Abi-Nassif | |
| 2006/0159045 | A1 | 7/2006 | Ananthaiyer et al. | |
| 2006/0240782 | A1 | 10/2006 | Pollman et al. | |
| 2006/0291420 | A1 | 12/2006 | Ng | |
| 2006/0294241 | A1 | 12/2006 | Cherian et al. | |
| 2007/0026884 | A1 | 2/2007 | Rao | |
| 2007/0058628 | A1 | 3/2007 | Rao et al. | |
| 2007/0077948 | A1 | 4/2007 | Sharma et al. | |
| 2007/0097916 | A1 | 5/2007 | Eyuboglu et al. | |
| 2007/0115896 | A1 | 5/2007 | To et al. | |
| 2007/0140172 | A1 | 6/2007 | Garg et al. | |
| 2007/0140184 | A1 | 6/2007 | Garg et al. | |
| 2007/0140185 | A1 | 6/2007 | Garg et al. | |

(Continued)

*Primary Examiner*—Juan A Torres
(74) *Attorney, Agent, or Firm*—Fish & Richardson P.C.

(57) ABSTRACT

In a cellular network, a GPS receiver includes circuitry that modulates a global positioning system (GPS) timing pulse signal with a carrier signal and transmits the modulated signal to one or more remote base stations. When the modulated timing pulse signal is received at a remote base station it is demodulated and a timing pulse signal corresponding to the GPS timing pulse signal is recovered. The remote base station may be configured to transmit a reply signal back to the GPS receiver, which can then be used to estimate a propagation delay between the GPS receiver and the remote base station.

47 Claims, 4 Drawing Sheets

U.S. PATENT DOCUMENTS

| | | |
|---|---|---|
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |

* cited by examiner

PROVIDING GLOBAL POSITIONING SYSTEM (GPS) TIMING SIGNALS TO REMOTE CELLULAR BASE STATIONS

TECHNICAL FIELD

This disclosure relates to providing Global Positioning System timing signals to one or more remote cellular base stations.

BACKGROUND

Cellular wireless communication systems are designed to serve many mobile station's distributed in a large geographic area by dividing the area into cells. At the center of each cell, a base station is located to serve mobile stations located in the cell. Each cell is often further divided into sectors by using multiple sectorized antennas (The term "sector" is used both conventionally and in this document, however, even when there is only one sector per cell.) In each cell, a base station serves one or more sectors and communicates with multiple mobile stations in its cell. Data may be transmitted between the base station and the mobile stations using analog modulation (such as analog voice) or digital modulation (such as digital voice or digital packet data).

A base station includes devices needed to transmit and receive signals to and from mobile stations, which typically include modems, up/down converters, analog-to-digital converters (ADCs), digital-to-analog converters (DACs), filters, low noise amplifiers (LNAs), power amplifiers, and transmit and receive antennas. A base station also includes devices to transmit and receive mobile station's signals as well as other control signals to and from other systems such as a base station controller that controls multiple base stations.

A Radio-Frequency (RF) carrier in a sector can handle up to a certain amount of data traffic, which is referred to as the capacity per carrier per sector or simply capacity. In general, the capacity is different in the forward and in the reverse links. Because base stations normally overlap RF coverage in a geographical area, and service hundreds or thousands of mobile station users, spectral interference among base and mobile stations is usually the dominant limitation of total system capacity. Thus, RF interference mitigation often becomes an important design objective for radio access networks. RF interference reduction techniques include frequency, time, or code domain separation of mobile and base station RF signals. A combination of these basic schemes can also be employed. For Code Division Multiple Access (CDMA) cellular networks, each base station sector operates at the same RF frequency, but with a different pseudorandom noise (PN) code as the base modulation of the carrier. The PN codes among co-located sectors are chosen as to have very low cross-correlation products when processed by the mobile station receiver de-correlation circuits. For this technique to work properly, precise timing and synchronization is required among the base stations to preserve the orthogonal cross-correlation properties of these PN codes.

In a conventional base stations, timing and synchronization functions are provided by a specialized GPS receiver that is incorporated into the base station equipment. This specialized GPS receiver typically provides time-of-day messages, a precise one or two second timing pulse, and an ultra-stable frequency reference. Because all base stations in a network derive their synchronization from the GPS network, excellent timing synchronization is achieved. In this conventional synchronization scheme, each base station is provided with a separate GPS receiver and must be located in a facility with access to an external GPS antenna system with visibility to the GPS satellites. As cellular networks become smaller with more numerous base stations per network, the cost of providing a separate GPS receiver at each base station can become considerable.

SUMMARY

In one aspect, the invention features a method for providing timing information to a base station in a cellular network that includes generating a timing pulse signal having a series of timing pulses occurring at a fixed frequency from received global positioning system (GPS) signals. The timing pulse signal is modulated with a carrier signal (such as a oscillating signal produced from a GPS receiver) and is transmitted to one or more remote base stations, where it may be demodulated and used to coordinate generation of carrier signals among the base stations.

In one particular implementation, the timing pulse signal is modulated by generating a pseudorandom noise code of symbols that repeats over time at a frequency of no greater than the fixed frequency of the timing pulse signal, and, where for each instance of the pseudorandom noise code of symbols, the occurrence of a pulse in the timing pulse signal is aligned with a predetermined position of one of the symbols in the code (e.g., the position of the first symbol in the code). In this implementation, a pseudorandom noise code generator may be driven by an oscillating signal produced by a GPS receiver (thus making the GPS oscillating signal the carrier signal) to generate the pseudorandom noise code signal. In this implementation, the pseudorandom noise code containing the timing pulse information may have a length that is less than the period of the timing pulse signal. In this case, bits may be added to the end of the pseudorandom noise code to increase its length to equal the period of the timing pulse signal. Messaging information (e.g., GPS time-of-day messaging) can be modulated by generating a pseudorandom noise code and bits from pseudorandom noise code can be added to the end of the pseudorandom noise code containing the timing information.

In another particular implementation, the modulated timing pulse signal is used as a carrier signal for a message signal. The message signal can be a signal that includes GPS time-of-day information, information about a propagation delay between the GPS unit and the remote base station, or other messaging information (e.g., control or status messaging information).

The method may also include determining a delay in propagating the modulating signal to the remote base station. In one implementation, the remote base station generates and transmits back to the GPS transmitter a reply signal upon receiving the modulated signal. When the GPS transmitter receives the reply signal, it can determine a delay between a derived timing signal at the remote base station and the timing signal generated from the received global positioning signals based on when the reply signal is received at the first location. The GPS unit may correct the transmitted modulated signal to account for this delay, or it may send a message to the remote base station that indicates the propagation delay (in which case the base station adjusts the derived timing signal).

In another aspect, the invention features an apparatus that includes a global positioning receiver that receives signals from a constellation of global positioning satellites and produce a timing pulse signal having a fixed frequency, a pseudorandom noise code generator that generates a pseudorandom noise code of symbols that repeats over time at a frequency of no greater than the fixed frequency of the timing pulse signal, where, for each instance of the pseudorandom noise code of symbols, the occurrence of a pulse in the timing pulse signal is aligned with a predetermined position of one of the symbols in the code, and a transmitter that transmits the pseudorandom code of symbols to a remote device.

In one particular implementation, the global positioning receiver is configured to generate an oscillating signal from the signals received from the constellation of global positioning satellites, and this oscillating signal is used to drive pseudorandom code generator to produce the series of pseudorandom noise code of symbols.

The pseudorandom noise code generator may be configured to generate a pseudorandom code of symbols having a length less than the period of the timing pulse signal, in which case, additional bits of data may be added to the end of each pseudorandom code of symbols to result in a signal having a period equal to the period of the timing pulse signal. The additional bits may be padding bits (i.e., bits that carry no information) or bits that carry messaging information.

In another implementation, the apparatus includes a mixing circuit that to mix message data with the generated pseudorandom noise code.

In another implementation, the apparatus includes a receiver that receives a pseudorandom code signal that was transmitted by the remote device upon the remote device's receipt of the transmitted pseudorandom code of symbols. This receiver circuit may include a shift register circuit that produces a pulse when the received a sequence of symbols in the received pseudorandom code signal matches with a predetermined sequence of symbols. The apparatus may include a delay circuit that delay transmission of the pseudorandom code of symbols to the remote device by an amount derived from the time the shift register circuit produced the pulse and a time at which a timing pulse occurs in the timing pulse signal.

In another aspect, the invention features a base station for use in a cellular communication network that includes an input for receiving a modulated timing pulse signal derived from a timing pulse signal having a fixed frequency generated by a remote global position system receiver and a demodulation circuit operably connected to the input and that demodulates the modulated timing pulse signal to derive a timing pulse signal corresponding to the timing pulse signal of the global positioning system receiver.

The modulated timing pulse signal may be a pseudorandom code of symbols having a frequency no greater than that of the fixed frequency of the timing pulse signal and the base station may also include a shift register circuit that receives the pseudorandom code signal and produces a pulse when the received a sequence of symbols in the received pseudorandom code signal matches with a predetermined sequence of symbols. The base station may also include an oscillator that drives the shift register circuit at a reference frequency. A phase lock loop circuit may also be provided for receiving the pseudorandom code of symbols and driving the oscillator circuit at the frequency of the pseudorandom code of signals.

In one particular implementation, the base station also includes a transmitter circuit that transmits a signal to a remote device upon receiving the modulated timing pulse signal. This transmitter circuit may include a pseudorandom noise code generator that generates a repeating pseudorandom sequence of symbols that have a frequency of no greater than the frequency of the timing pulse signal.

In another aspect, the invention features a method of accurately distributing GPS timing and synchronization signals from a central GPS receiver to one or more remote base stations. The distributed GPS signals may include a GPS stabilized frequency reference, GPS-derived timing pulses, and GPS-derived time-of-day messages. In some implementations, messages, such as control and status messages, can be included within the distributed GPS timing and synchronization signals.

In another aspect, the invention features a method of providing GPS timing and synchronization signals from a central GPS receiver to one or more remote base stations using a wide range of transmission media such as twisted pair wiring, fiber optic, wireless, and existing in-building wiring (e.g., unused telephone wiring, network wiring, or power-line wiring).

In another aspect, the invention features a method for providing GPS timing and synchronization signals from a central GPS receiver to one or more remote base stations in which the propagation delay of the timing signals from the central GPS receiver to the base stations is automatically corrected.

In anther aspect, the invention features a network of base stations having a central GPS unit, which receives the GPS satellite signals and distributes the derived frequency, timing, and messages to the base station units. In one particular implementation, the GPS receiver and distribution unit and base station units can be configured in a star or tree network topology. In another implementation, the GPS and base station units are configured in a daisy chain or cascade topology.

In another implementation, the network includes two centralized GPS units to provide full redundancy for the network. In this embodiment, the GPS units can be operated in a master-slave configuration, with one unit designated as a hot standby unit. Switching from standby to active is preferably automatic and does not disrupt the radio access network operation.

The GPS unit can further include a timing compensation module to compensate for the delay incurred by the propagation of the timing signal associated with the GPS to Base Station connection path. In one implementation, the timing compensation module is configured to measure an intermediate path delay for computation of a total path delay when the system is connected in a cascade configuration.

The GPS and base station units can each further include a messaging module that includes a message transmitter and receiver. The messaging module can be used to transmit and receive time-of-day, status and control signals, signals indicating the measured propagation delay between the GPS unit and remote base station unit, or other messages between the GPS and base station units.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
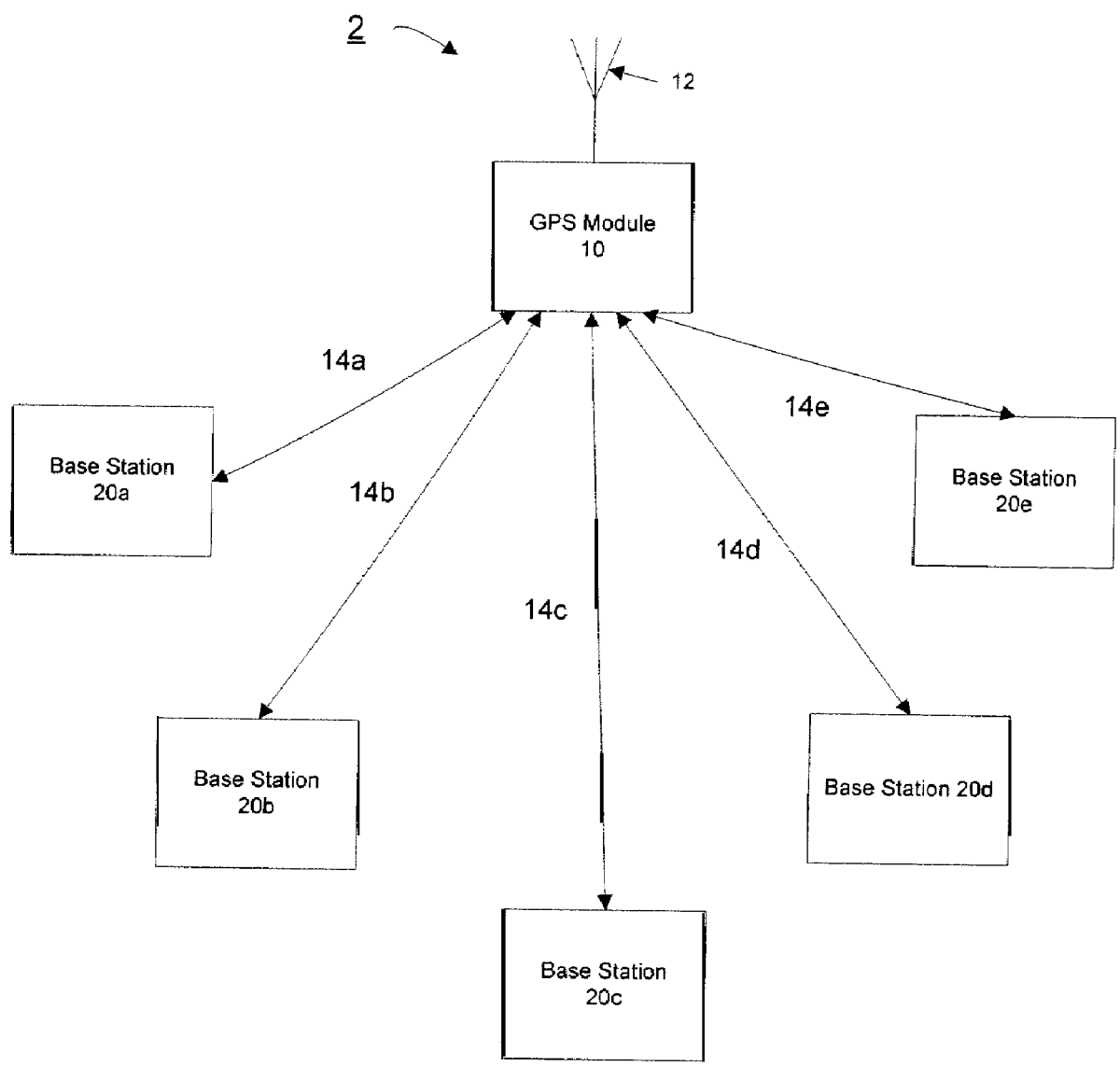
FIGS. 1A-1B are diagrams of a centralized GPS unit connected to a network of base stations.

Referring to FIG. 1A, a cellular communication network 2 includes a central GPS module 10 connected to a network of five base station units 20a-20e. Each of the base stations may be physically separated from the GPS module by differing distances. For example, one base station may be co-located with the GPS module, while other base stations are located at various distances from the GPS module.

In operation, the GPS module 10 receives GPS signals from a constellation of GPS satellites via an antenna 12 and produces the following set of GPS timing signals:

(1) a timing pulse train having a fixed period between pulses (e.g., 1 second) (the "GPS timing pulse signal");

(2) an oscillator signal that is disciplined by the GPS timing pulses (the "GPS oscillator" signal); and (3) a series of demodulated GPS time-of-day messages.

The GPS module 10 supplies GPS timing signals to each of the base stations using communications links 14a-14e, where they are used to coordinate generation of carrier signals among the base stations. The communication links 14a-14e may be implemented using any known communication media including twisted pair cabling, fiber optic wire, or wireless links. In some implementations, existing in-building wiring such as unused telephone wiring, network wiring, or power-line wiring is used to connect one or more of the base stations to the central GPS module.

For base stations that are co-located with to the GPS module, the timing signals may be provided directly to the base station. However, for base stations that are located remotely from the GPS module, the GPS module modulates the GPS timing pulse signal with a carrier signal (e.g., the GPS oscillating signal) to center the energy of the pulses around the high frequency carrier. This allows the GPS timing pulse to be transmitted to a remote base station using a smaller fractional bandwidth than if the raw timing signal were transmitted to the remote base station.

In one implementation, the GPS module modulates the GPS oscillator signal with the timing pulse signal using pseudorandom noise (PN) codes. In particular, the GPS module includes a PN code generator that generates a PN code sequence from the GPS oscillator signal that has a length less than or equal to 1/frequency of the GPS timing pulse signal. In addition, the GPS module ensures that each GPS timing pulse aligns with a particular location within the PN code sequence (e.g., the timing pulse aligns with the first bit of the PN code sequence).

Messages such as GPS time-of-day messages, messages indicating a propagation delay between the GPS unit and a base station, or other messages can be modulated with the PN code sequence and delivered to the base stations via the communication links 14a-14e. Alternatively, if the PN code is selected such that it has a period of less than the period of the GPS timing pulses, message information may be modulated in so-called short PN codes that are then included in the extra bits between the end of one PN code sequence and the start of the next.

The remote base stations 20a-20e are equipped to receive and decode the transmitted PN code sequences to recover the GPS oscillator signal and GPS timing pulses, as well as any messages that were included with the received signal.

In addition, the GPS unit 10 and/or the base stations 20a-20e include circuitry for determining and correcting delay between a received PN code signal and the GPS timing signals due to the time it takes for the PN code signal to propagate from the GPS unit 10 to each respective base station.

Figure 1B:
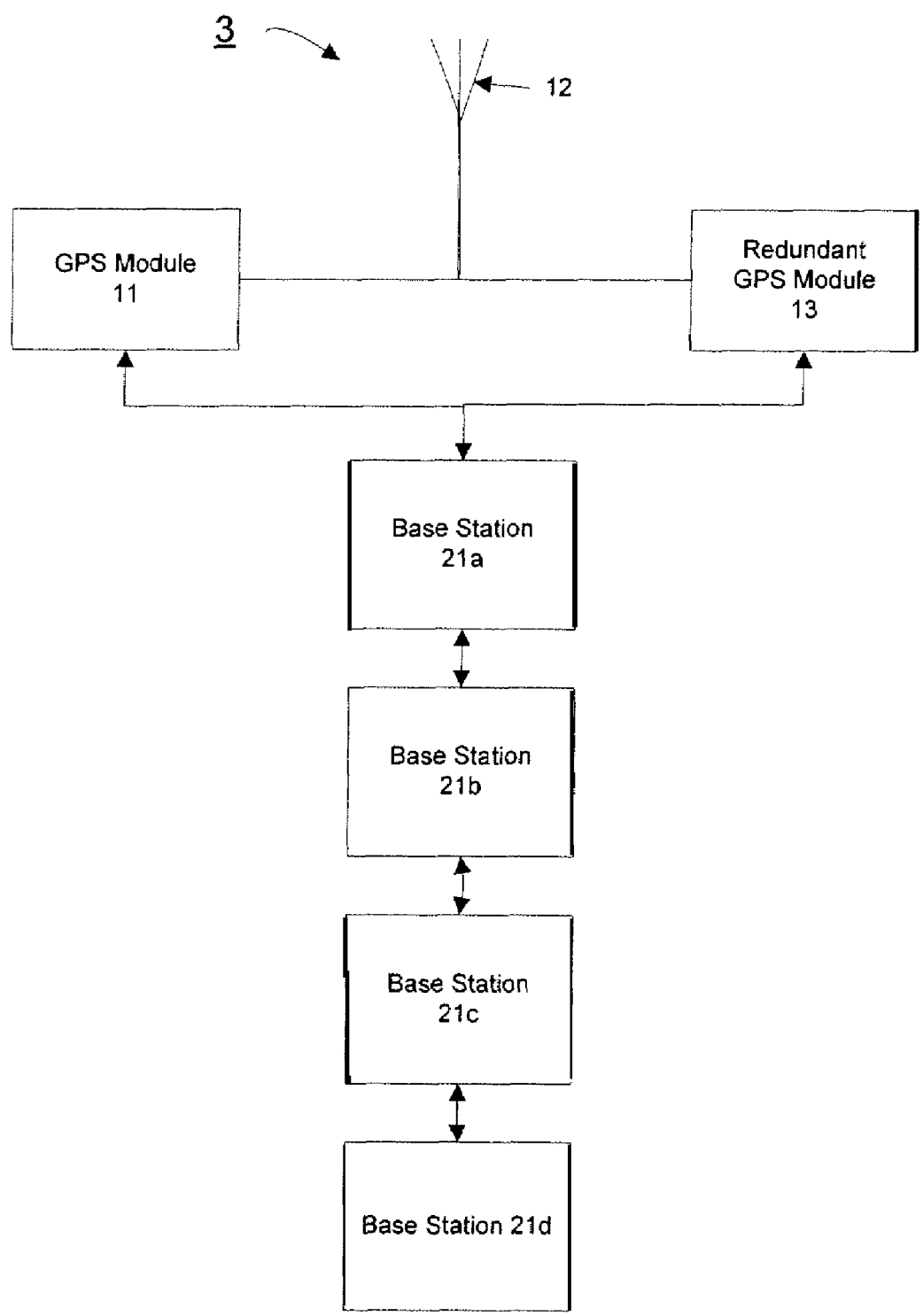

In this particular example, the base stations 20a-20e and central GPS module 10 are arranged in a star network with the GPS module as the hub. Other implementations, my employ different network topologies, such as a tree, bus, ring, chain, or mesh network topology, to connect a central GPS module with one or more base stations. For example, as shown in FIG. 1B, a radio network 3 includes a central GPS module 11 that is in communication with four base stations 21a-21d using a chain network topology. In this implementation, the GPS module 11 includes a mechanism that automatically corrects the GPS signal supplied to the first base station in the chain, i.e., base station 21a, for the propagation delay caused by the sending the signals from the GPS module 11 to the first base station. The first, second and third base station modules, i.e., base station modules 21a-21c, include a similar mechanism to automatically correct for the propagation delays experienced between the first and second, second and third and third and fourth base stations.

In this implementation, a redundant GPS module 13 is provided as a backup system in the event of failure by the primary GPS module 11. The primary 11 and redundant 13 GPS modules are preferably configured to operate in a master-slave configuration in which the redundant unit automatically switches from standby to active if the primary unit fails so that failure of the primary unit does not disrupt operation of the radio network.

Figure 2A:
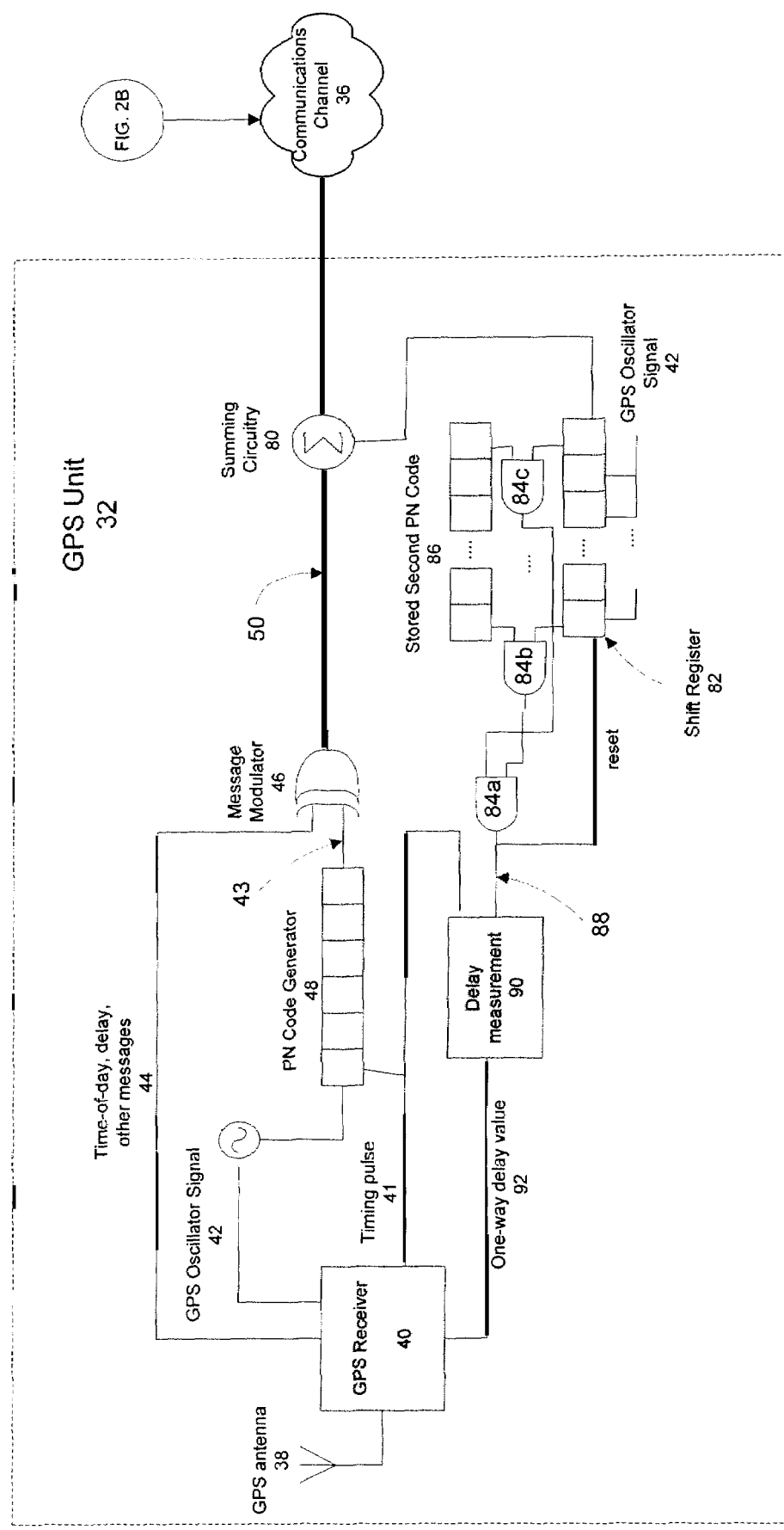
FIGS. 2A-2B are block diagrams of a centralized GPS unit in communication with a remote base station.
Figure 2B:
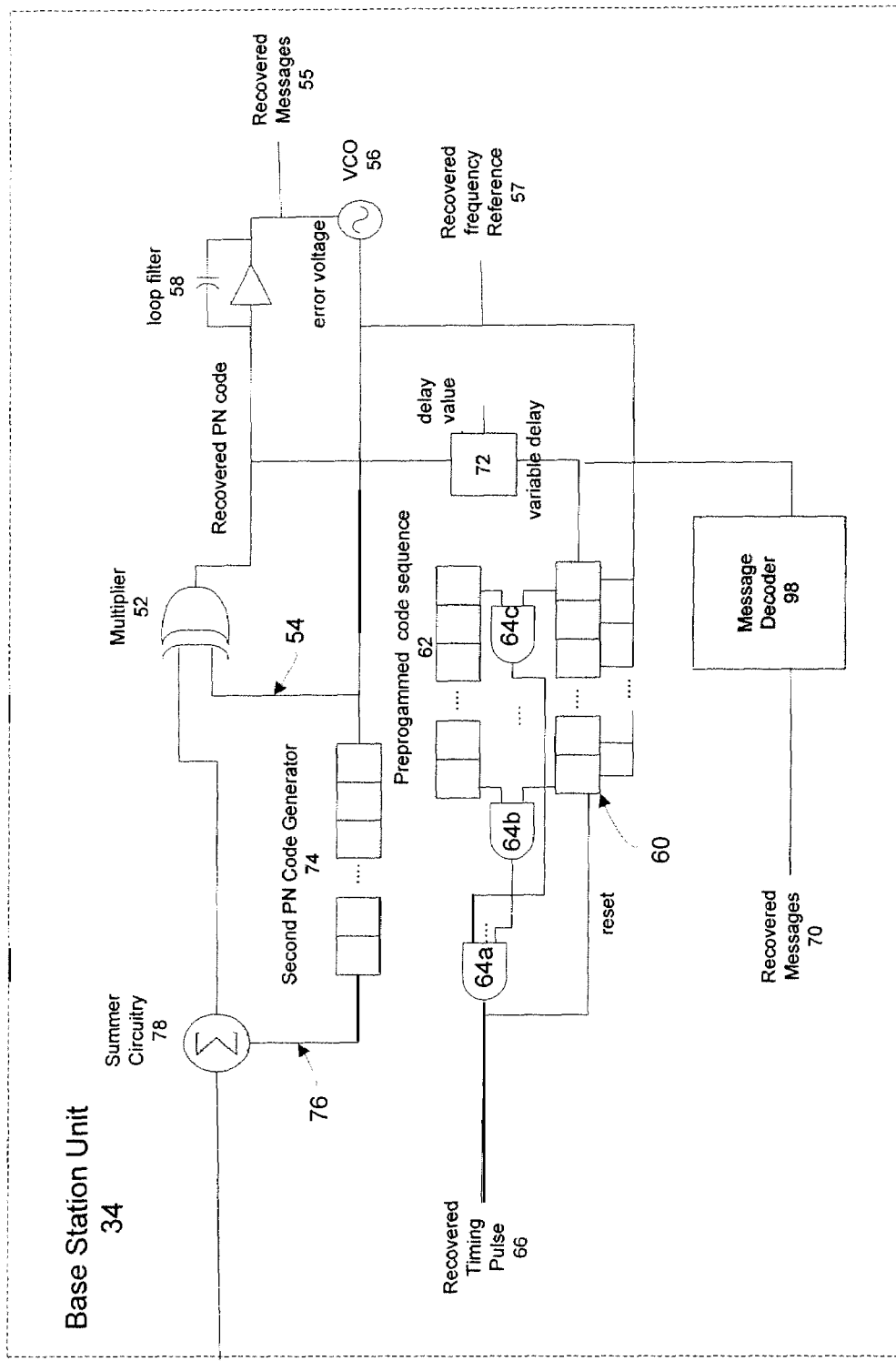

Referring to FIGS. 2A-2B, a cellular system 30 includes a GPS module 32 and a remote base station 34 that are interconnected via a transmission media 36, such as twisted pair wiring, coaxial wiring, wireless (RF), optical fiber, power-line, or any other known media for transmitting digital or analog communication.

The GPS module 32 includes a GPS antenna 38 visible to the GPS satellite constellation, and a base GPS receiver 40. The base GPS receiver 40 may be any commercially-available GPS receiver that demodulates the GPS satellite signals and produces an GPS oscillator signal, a GPS timing pulse signal, and demodulated GPS time-of-day messages.

If the base station is co-located with the GPS unit, these timing signals are output directly to the modem and RF circuits of the Base Station and are used by these functions for timing and frequency synchronization. However, if the base station is located remotely from the GPS unit (as shown in FIGS. 2A-2B), the GPS 32 unit modulates the GPS timing signals and transmits them to the remote base station. The GPS unit 32 also automatically compensates for propagation delay caused due to the transmission of the timing signals to the remote base station.

Referring again to FIGS. 2A-2B, the GPS oscillator signal 42 and timing pulse signal 41 are used to drive a pseudo-random code generator 48, which generates a repeating PN code that is selected to have a length that equal to or less than the period of the GPS timing pulse signal (e.g., one or two seconds). If the PN code has a length that is less than the period of the GPS timing pulse signal, additional bits are added to the PN code sequence to produce a code sequence that is equal to the period of the GPS oscillator. Rather than simply using padding bits, the additional bits may be bits of a short PN code that represents a GPS time-of-day message or another message to that is to be transmitted to the remote base stations. The resulting PN signal 43 is a series of repeating PN codes that are transmitted only once per timing interval, and are aligned with the GPS timing pulse such that the first bit of each PN code corresponds to a GPS timing pulse.

In the case where the PN code produced from the GPS oscillator signal is shorter than the pulse repetition interval used for the timing pulse transmission, the unused portion of the timing interval can be utilized for message communication. In this case, the message signals can be modulated with another PN code (called a short PN code), the bits of which can be added to the unused portion of the timing interval.

In the implementation shown in FIGS. 2A-2B, a message modulator 46 modulates messages (e.g., GPS time-of-day message signals, delay message signals, or other message signals such as control or status message signals) with the PN code signal 43. (Thus, the frequency of the GPS oscillator signal serves as the as the carrier frequency for the time-of-day, delay or ancillary messages that are to be sent to the remote base station). The modulated PN code signal is then propagated to the remote base station 34 via the transmission medium 36.

At the remote Base Station 34 unit, the received PN code signal is applied to a multiplier circuit 52. The other input 54 to the multiplier circuit 52 is connected to the output of a voltage-controlled local oscillator (VCO) 56 in the Base Station unit. The output of the multiplier circuit 52 is passed through a loop filter circuit 58 and then input into the VCO 56. Thus, the multiplier circuit 52, the loop filter 58, and the VCO 56 form a negative feedback control system which drives the VCO 56 to produce a signal 57 having the same frequency and phase as the disciplined oscillator signal 42 of the GPS unit. The output of the multiplier circuit 52 contains the PN code sequence plus a DC error term, which is produced by the multiplication process. The DC error term is integrated in a loop filter 58 and the resulting signal is used to drive the voltage control port of Base Station's VCO.

Once the VCO 56 is locked to the frequency of the disciplined oscillator signal 42 of the GPS unit, the output of the multiplier circuit is the original PN sequence generated by the GPS transmitter unit. This recovered PN sequence is applied to a shift register 60 which shifts the sequence once every clock cycle of the local oscillator. The output of each cell of the shift register 60 is statically compared (see comparators 64a-64c) to a local copy 62 of the PN code which is pre-programmed the Base Station unit. Because the transmitted PN code sequence does not repeat during the one period timing interval, there exists only one unique set of the shift register bit pattern that matches the locally held PN pattern bit-for-bit. Each value of the shift register cells is compared to locally held PN code pattern, and an output pulse 66 is generated when all cell outputs equal the pre-programmed PN pattern. This output pulse 66 constitutes the recovered timing pulse which initiated the start of the PN sequence in the central GPS unit, and can be used by the remote base station to synchronize the radio and modem circuits to GPS time.

As mentioned above, this implementation includes a message modulator 46 in the GPS unit that mixes a message bit stream 44 with the PN code signal 43. The message bit stream 44 can be a GPS time-of-day message, a message indicating the propagation delay (explained below), a control or status message from the GPS unit to the base station, or another message destined for the base station 34. Once the base station obtains the PN code sequence, it is applied (with a delay 72 explained below) to a decoder circuit 98 that decodes received signal from the GPS unit to recover the messages 70.

As mentioned above, some implementations may have a PN code sequence that is less than the length of the period of the GPS oscillator signal. In these implementation, message packets containing the time-of-day, delay, status/control, etc. messages are be inserted before the start of the PN code. In this case, the base station receiver correlates the incoming signal with the short PN code, which will output one bit every time the short code rolls. For example, if a short code takes 1 millisecond from start to finish, then one bit of information can be extracted every millisecond. The short PN codes are preferably selected to be orthogonal to the long PN codes (i.e., the PN codes that contain the timing pulse information) in order to reduce the likelihood that a short code would cause a spurious timing pulse at that remote base station.

By using the long PN code to modulate messages or by using a short PN code (with the message information) combined with the long PN code (with the timing pulse information), a separate transmission channel is not required for additional messaging.

In some implementations, the PN code signal 50 is modified prior to transmission. For example, if the transmission medium 36 is a wireless medium, the PN code signal 50 can be adjusted to 2.45 GHz, which is a carrier frequency currently permitted by the Federal Communication Commission for unlicensed wireless operation. Similarly, if optical fiber is used, the GPS unit can adjust the PN code signal 50 OC-3, which is common transmission rate for optical fiber.

In addition to providing a timing mark, GPS oscillator signal and messages to the remote base station, the system 30 also automatically compensates for the delay propagation time between the GPS module 32 and the remote Base Station 34. Because the remote units can be located at considerable distance from the GPS module 32, a non-negligible delay can arise between the oscillator signal at the GPS unit 32 and the recovered oscillator signal at the base station 34 due to the time it takes the signal to propagate from the GPS unit 32 to the remote base station 34.

To compensate for this propagation delay the system 30 preferably includes a mechanism for measuring the round-trip delay time and then delays the base station recovered timing pulse by one-half of the calculated round-trip delay time. The system 30 measures the roundtrip delay of the transmission media by causing the base station to generate and transmit to the GPS unit 32 a second PN code upon reception of the original PN code sent from the GPS unit 32. When the GPS unit 32 receives the second PN code, it calculates the one-way propagation delay and adjusts the local base station timing pulse to compensate for the delay.

Referring again to FIG. 2B, the recovered timing pulse, (before delay compensation) is utilized to reset (seed) a second PN code generator 74 located in the base station module 34. As in the case of the forward propagating the PN code signal from the GPS unit 32 to the base station unit 34, the only constraint on the second PN code is that it is a unique code that is repeated transmitted only once per timing pulse interval. The second PN code 76 is applied to a combining network 78 which impresses the second PN code 76 on the transmission channel 36 to propagate it back to the GPS unit 32. Alternative methods of combining the first and second PN code signals can be realized, each of which results in different two-way communication duplexing realizations. One technique for combining the two PN code signals is to double the frequency of the input clock (derived from the now stabilized VCO) at the base station unit 34, which results in frequency division diplexing. A frequency divider would then precede the delay PN decoder at the GPS timing module. Another method would be to utilize base PN codes that are shorter than the timing pulse interval of one or two seconds, and the second PN code could be added after the timing pulse reception, resulting in a time-division diplexing realization.

At the GPS unit 32, the second PN code is separated from the outgoing PN sequence with a combining network 80. The combining network 80 has different implementations depending on the diplexing scheme chosen to transmit the second PN code signal. For example, if frequency division diplexing is chosen, then the combiners 78, 80 could be realized using frequency diplexers. If time division diplexing is chosen, then the combiners 78, 80 could be realized with synchronous time division multiplexer and demultiplexers.

Once the incoming and outgoing PN code signals are separated at the GPS unit 32, the reverse direction PN sequence (i.e., the second PN code signal 76) is applied to a shift register 82 that shifts the sequence by one bit every clock cycle of the local oscillator. The output of each cell of the shift register is statically compared (using comparators 84a-84c) to a local copy of the second PN code 86 which is pre-programmed into the GPS unit 32. Because the second PN code sequence does not repeat during the round trip timing interval, there exists only one unique set of the shift register bit pattern that matches the locally held PN pattern bit-for-bit. Each value of the shift register cells is compared to the locally held PN code pattern, and an output pulse 88 is generated when all cell outputs equal the pre-programmed PN pattern. The output pulse 88 is delayed in time from the locally generated GPS timing pulse 41 by the round trip propagation delay of the transmission channel 36.

The output pulse 88 and the GPS timing pulse 41 are applied to a delay measurement function 90 that computes the one-way delay value 92 between the GPS unit 32 and the remote base station unit 34. In one implementation, the delay measurement function 90 is realized by a shift register circuit in which the GPS timing pulse 41 is inputted into a serial shift register. The pulse is shifted through the register by the stabilized GPS oscillator signal and the shift register logic circuits are configured to abort the clock shifting operation the roundtrip delay timing pulse 88 is received. Logic elements are configured at the output of each stage of the shift register to determine the final position of the initial timing pulse when the shifting process has been terminated. The roundtrip delay value is computed by the final position of the timing pulse multiplied by the number of clock cycles required to reach that position times the clock period. The one-way delay value 92 is then computed by dividing this number by two.

In the implementation shown in FIGS. 2A-2B, the one-way delay value communicated back to the remote base station unit via the messaging channel. In the remote base station, the delay message is decoded to obtain the one-way delay value. This value is introduced into the shift register via the delay function 72. The delay function 72 can be realized by a shift register which is programmed to shift the incoming PN code signal by the number of clock cycles contained in the delay message. This causes all timing pulses, except the first pulse, to be aligned with the original GPS module base timing pulse. In this implementation, the time-of-day messages are incremented by the length of one timing pulse to account for the one timing pulse absolute delay in the delay compensation network.

A number of embodiments of the invention have been described. Nevertheless, it will be understood that various modifications may be made without departing from the spirit and scope of the invention. For example, a system can provided with the ability to send and receive messages from the base station to the GPS timing distributor module by packaging the messages with the second PN code sequence signal. This messaging function can be realized in the same way as the GPS-to-base station messaging capability described above is realized. By providing a system with base station-to-GPS and GPS-to-base station messaging capability, the resulting system achieves two-way communication messaging capability over a single communications channel. Accordingly, other embodiments are within the scope of the following claims.

What is claimed is:

1. A method comprising:
    generating an oscillating signal and a timing pulse signal having a fixed frequency from received global positioning system signals at a first location;
    modulating the oscillating signal with the timing pulse signal to produce a modulated signal, wherein modulating the oscillating signal with the timing pulse signal comprises using the oscillating signal to generate a pseudorandom noise code of symbols that repeats over time at a frequency of no greater than the fixed frequency of the timing pulse signal, wherein for each instance of the pseudorandom noise code of symbols, the occurrence of a timing pulse in the timing pulse signal is aligned with a predetermined position of one of the symbols in the pseudorandom noise code of symbols; and
    transmitting the modulated signal to a device located at a second location through a communications channel, the device being configured to process the modulated signal to attempt to synchronize the device to global positioning system time.

2. The method of claim 1 wherein the predetermined position is the same symbol position for each instance of the pseudorandom noise code of symbols.

3. The method of claim 1 wherein the predetermined position is the first symbol position for each instance of the pseudorandom noise code of symbols.

4. The method of claim 1 wherein the pseudorandom noise code of symbols has a length less than a period of the timing pulse signal, the method further comprising:
    adding bits to each instance of the pseudorandom noise code of symbols such that the resulting signal has a period approximately equal to the period of the timing pulse signal.

5. The method of claim 4 wherein the bits carry no information.

6. The method of claim 4 wherein the bits comprise bits representing messaging information.

7. The method of claim 1 further comprising:
    generating a time-of-day message from the received global positioning system signals.

8. The method of claim 4 further comprising:
    generating a time-of-day message from the received global positioning system signals,
    wherein the bits comprise bits representing the time-of-day message.

9. The method of claim 1 wherein modulating the oscillating signal with the timing pulse signal to produce the modulated signal further comprises:
    mixing message data with the pseudorandom noise code of symbols.

10. The method of claim 1 further comprising:
    receiving the modulated signal at the second location; and
    deriving the oscillating signal and timing pulse signal from the modulated signal.

11. The method of claim 1 further comprising:
    receiving the modulated signal at the second location; and
    driving an oscillator at the second location with the modulated signal to derive the oscillator signal.

12. The method of claim 1 further comprising:
    receiving the modulated signal at the second location;
    recovering the pseudorandom noise code of symbols from the modulated signal;
    comparing the pseudorandom noise code of symbols over time with a copy of the pseudorandom noise code stored at the second location; and
    generating a pulse when the pseudorandom noise code of symbols matches with the copy of the pseudorandom noise code of symbols.

13. The method of claim 1 further comprising:
    determining a propagation delay time for propagating the modulated signal from the first location to the second location.

14. The method of claim 13 further comprising:
adjusting the modulated signal to account for the propagation delay time.

15. The method of claim 14 wherein adjusting the modulated signal occurs at the first location.

16. The method of claim 14 wherein adjusting the modulated signal occurs at the second location.

17. The method of claim 1 further comprising:
upon receiving the modulated signal at the second location, generating a second pseudorandom noise code of symbols that repeats over time at a frequency no greater than the fixed frequency of the timing pulse signal; and
transmitting the second pseudorandom noise code of symbols to the first location.

18. The method of claim 17 wherein the second pseudorandom noise code of symbols is transmitted over the same communications channel as the modulated signal.

19. The method of claim 17 further comprising:
receiving the second pseudorandom noise code of symbols at the first location; and
determining a propagation delay time between the first and second locations based on the second pseudorandom noise code of symbols.

20. The method of claim 17 further comprising:
receiving the second pseudorandom noise code of symbols at the first location;
comparing the second pseudorandom noise code of symbols received over time with a copy of the second pseudorandom noise code of symbols stored at the first location; and
generating a pulse when the second pseudorandom noise code of symbols matches with the copy of the second pseudorandom noise code of symbols.

21. The method of claim 20 further comprising:
comparing the pulse generated by the second pseudorandom noise code of symbols with another timing pulse of the timing pulse signal to determine a propagation delay time between the first and second locations.

22. The method of claim 21 further comprising:
adjusting the alignment of the predetermined position of the one of the symbols in the pseudorandom noise code of symbols with the occurrence of the timing pulse by the propagation delay time such that when the modulated signal is received at the second location, the occurrence of a symbol in the predetermined position within the pseudorandom noise code of symbols at the second location happens at approximately the same time as a corresponding timing pulse in the timing pulse signal at the first location.

23. The method of claim 22 wherein the adjusting the alignment occurs at the second location.

24. The method of claim 22 wherein the adjusting the alignment occurs at the first location.

25. The method of claim 23 further comprising transmitting a message indicating the propagation delay time to the second location.

26. Apparatus comprising:
a global positioning receiver configured to receive signals from a constellation of global positioning satellites and produce a timing pulse signal having a fixed frequency;
a pseudorandom noise code generator configured to generate a pseudorandom noise code of symbols that repeats over time at a frequency of no greater than the fixed frequency of the timing pulse signal, wherein for each instance of the pseudorandom noise code of symbols, the occurrence of a timing pulse in the timing pulse signal is aligned with a predetermined position of one of the symbols in the code; and
a transmitter configured to transmit the pseudorandom noise code of symbols to a remote device.

27. The apparatus of claim 26 wherein the global positioning receiver is configured to generate an oscillating signal from the signals received from the constellation of global positioning satellites.

28. The apparatus of claim 27 wherein the oscillating signal is applied to the pseudorandom noise code generator to produce the series of pseudorandom noise code of symbols.

29. The apparatus of claim 26 wherein the predetermined position is the same symbol position for each instance of the pseudorandom noise code of symbols.

30. The apparatus of claim 26 wherein the predetermined position is the first symbol position for each instance of the pseudorandom noise code of symbols.

31. The apparatus of claim 26 wherein the pseudorandom noise code generator is configured to generate the pseudorandom noise code of symbols having a length less than a period of the timing pulse signal.

32. The apparatus of claim 31 wherein the pseudorandom noise code generator is further configured to add bits to each instance of the pseudorandom noise code of symbols such that the resulting signal has a period approximately equal to the period of the timing pulse signal.

33. The apparatus of claim 32 wherein the bits comprise bits representing messaging information.

34. The apparatus of claim 26 wherein the global positioning receiver is configured to generate a time-of-day message from the signals received from the constellation of global positioning satellites.

35. The apparatus of claim 26 further comprising:
a mixing circuit configured to mix message data with the pseudorandom noise code of symbols.

36. The apparatus of claim 26 further comprising:
a receiver configured to receive a second pseudorandom noise code of symbols from the remote device that was transmitted by the remote device upon the remote device's receipt of the pseudorandom noise code of symbols.

37. The apparatus of claim 36 further comprising:
a shift register circuit configured to receive the second pseudorandom noise code of symbols from the remote device and produce a pulse when a sequence of symbols in the second pseudorandom noise code of symbols matches with a predetermined sequence of symbols.

38. The apparatus of claim 36 further comprising:
a delay circuit configured to delay transmission of the pseudorandom noise code of symbols to the remote device by an amount derived from the time the shift register circuit produced the pulse and a time at which a corresponding timing pulse occurs in the timing pulse signal.

39. A base station for use in a cellular communication network, the base station comprising:
an input configured to receive a modulated timing pulse signal derived from a timing pulse signal having a fixed frequency, the modulated timing pulse signal being generated by a remote global positioning system receiver, wherein the modulated timing pulse signal comprises a pseudorandom noise code of symbols having a frequency no greater than that of the fixed frequency of the timing pulse signal; and
a demodulation circuit operably connected to the input and configured to demodulate the modulated timing pulse signal to derive a second timing pulse signal corresponding to the timing pulse signal of the remote global positioning system receiver to attempt to synchronize the base station to global positioning system time, wherein the demodulation circuit comprises:

a shift register circuit configured to receive the pseudorandom noise code of symbols and produce a pulse when a sequence of symbols in the pseudorandom noise code of symbols matches with a predetermined sequence of symbols; and an oscillator configured to drive the shift register circuit at a reference frequency.

40. The base station of claim 39 further comprising:

a phase lock loop circuit configured to receive the pseudorandom noise code of symbols and drive the oscillator at the frequency of the pseudorandom noise code of symbols.

41. The base station of claim 40 wherein the frequency of the pseudorandom noise code of symbols corresponds to a frequency of an oscillating signal produced by the remote global position system receiver.

42. The base station of claim 39 further comprising:

a transmitter circuit configured to transmit a signal to a remote device upon receiving the modulated timing pulse signal.

43. The base station of claim 42, wherein the transmitter circuit comprises:

a pseudorandom noise code generator configured to generate a repeating pseudorandom noise sequence of symbols that have a frequency of no greater than the fixed frequency of the timing pulse signal.

44. A method for providing timing information to a base station in a cellular network, the method comprising:

receiving global positioning signals from a constellation of global positioning satellites;

generating a first timing pulse signal having a series of timing pulses occurring at a fixed frequency from the global positioning signals;

modulating, at a first location, the first timing pulse signal with a carrier signal to produce a modulated signal, wherein modulating the first timing pulse with signal with the carrier signal comprises generating a pseudorandom noise code of symbols that repeats over time at a frequency of no greater than the fixed frequency of the first timing pulse signal, wherein for each instance of the pseudorandom noise code of symbols, the occurrence of a timing pulse of the series of timing pulses in the first timing pulse signal is aligned with a predetermined position of one of the symbols in the pseudorandom noise code of symbols; and transmitting the modulated signal to the base station, the base station being located at a second location, wherein the second location is remote from the first location, and wherein the base station is configured to process the modulated signal to attempt to synchronize the base station to global positioning system time.

45. The method of claim 44 further comprising:

receiving the modulated signal at the base station; and demodulating the modulated signal to derive a second timing pulse signal at the base station corresponding to the first timing pulse signal generated from the global positioning signals.

46. The method of claim 45 further comprising:

upon receiving the modulated signal at the base station, generating at the base station a reply signal; and transmitting the reply signal to a receiver at the first location.

47. The method of claim 46 further comprising:

receiving the reply signal at the first location; and determining a delay between the second timing pulse signal at the base station and the first timing pulse signal generated from the global positioning signals based on when the reply signal is received at the first location.

* * * * *

UNITED STATES PATENT AND TRADEMARK OFFICE
CERTIFICATE OF CORRECTION

| | |
|---|---|
| PATENT NO. | : 7,558,356 B2 |
| APPLICATION NO. | : 10/954864 |
| DATED | : July 7, 2009 |
| INVENTOR(S) | : Michael D. Pollman et al. |

It is certified that error appears in the above-identified patent and that said Letters Patent is hereby corrected as shown below:

Title Page, References Cited (56), Line 4, Delete-"Wheatley et al.", Insert- --Wheatley, III et al.--

Signed and Sealed this

Twenty-fifth Day of August, 2009

David J. Kappos
*Director of the United States Patent and Trademark Office*